(12) United States Patent
Wang et al.

(10) Patent No.: US 12,164,789 B2
(45) Date of Patent: Dec. 10, 2024

(54) STORAGE SYSTEM AND ENERGY-SAVING CONTROL METHOD

(71) Applicant: Huawei Technologies Co., Ltd., Shenzhen (CN)

(72) Inventors: Jiangtao Wang, Shenzhen (CN); Na Wang, Chengdu (CN); Fang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/145,303

(22) Filed: Dec. 22, 2022

(65) Prior Publication Data

US 2023/0125240 A1    Apr. 27, 2023

Related U.S. Application Data

(63) Continuation of application No. PCT/CN2021/103314, filed on Jun. 29, 2021.

(30) Foreign Application Priority Data

Jun. 30, 2020    (CN) .......................... 202010616644.9

(51) Int. Cl.
  *G06F 3/00*    (2006.01)
  *G06F 3/06*    (2006.01)

(52) U.S. Cl.
  CPC ............ *G06F 3/0625* (2013.01); *G06F 3/061* (2013.01); *G06F 3/0629* (2013.01); *G06F 3/0673* (2013.01)

(58) Field of Classification Search
  None
  See application file for complete search history.

(56) References Cited

U.S. PATENT DOCUMENTS

| | | | | |
|---|---|---|---|---|
| 2007/0250679 | A1* | 10/2007 | Umemura | G06F 3/0689 711/170 |
| 2018/0095930 | A1* | 4/2018 | Lu | G11C 13/0002 |
| 2022/0129191 | A1* | 4/2022 | Ma | G06F 3/0631 |

FOREIGN PATENT DOCUMENTS

| | | | |
|---|---|---|---|
| CN | 101493754 A | 7/2009 | |
| CN | 105278656 A | 1/2016 | |
| CN | 109491613 A | 3/2019 | |
| GB | 2618805 A * | 11/2023 | ............... G06F 1/30 |

* cited by examiner

*Primary Examiner* — Midys Rojas
(74) *Attorney, Agent, or Firm* — Slater Matsil, LLP

(57) ABSTRACT

This application provides a storage system includes disks grouped into disk groups. One disk group processes an IO service, and another disk group is in an energy-saving state or a sleep state and provides a standby disk for a previous disk group. IO load is focused on a disk in one disk group, so that a requirement for processing the IO service is satisfied by using this group of disks. In addition, the another disk group may save energy or sleep, so that more energy consumption can be reduced. Moreover, resource pools of different levels are implemented by using a plurality of disk groups. When a disk in a previous disk group is in shortage, a capacity of the previous disk group can be expanded by using a next disk group.

21 Claims, 8 Drawing Sheets

STORAGE SYSTEM AND ENERGY-SAVING CONTROL METHOD

CROSS-REFERENCE TO RELATED APPLICATIONS

This application is a continuation of International Application No. PCT/CN2021/103314, filed on Jun. 29, 2021, which claims priority to Chinese Patent Application No. 202010616644.9, filed on Jun. 30, 2020. The disclosures of the aforementioned applications are hereby incorporated by reference in their entireties.

TECHNICAL FIELD

This application relates to the field of storage technologies, and in particular, to a storage system and an energy-saving control method.

BACKGROUND

With rapid growth of data storage requirements, power consumption of storage systems in data centers keeps increasing. Electricity consumption becomes a primary issue to be resolved for operation and maintenance of the data centers. At the same time, due to continuous global warming and international and domestic energy shortage, various industries put forward technical requirements for energy saving and emission reduction. As high energy consumption products, the storage systems also urgently need to resolve problems of high energy consumption and high carbon emission. In view of this, how to properly and effectively save energy of a storage system becomes a hot research topic in this field.

Hardware of the storage system mainly includes components such as a central processing unit (CPU) and a memory. A disk is a main power-consuming component of the storage system and is in urgent need of energy-saving design improvement. Currently, the storage system detects a current state of the disk, starts timing if the disk is in an idle state, and controls the disk to enter a sleep state when recorded duration reaches preset duration. If an input/output (IO) request for the disk is received, the disk is woken up, and an IO service is processed by using the disk.

When the foregoing method is used to perform energy-saving control, because the storage system generally divides all disks into redundant arrays of independent disks (RAID), and different disks in the RAID perform a read/write operation at the same time, sleep is triggered only when all the disks enter an idle state. However, during actual application, the storage system has IO load most of time. As a result, all the disks cannot sleep, which reduces less energy consumption and has a poor energy-saving effect.

SUMMARY

Embodiments of this application provide a storage system and an energy-saving control method, to improve an energy-saving effect of the storage system. The technical solutions are as follows.

According to a first aspect, a storage system is provided. The storage system includes a first disk group, a second disk group, and a third disk group. The first disk group is configured to process an IO service. The second disk group is configured to provide a standby disk for the first disk group, and the second disk group is in an energy-saving state. The third disk group is configured to provide a standby disk for the second disk group, and the third disk group is in a sleep state.

In the storage system described above, disks are grouped. One disk group processes an IO service, and another disk group is in an energy-saving state or a sleep state and provides a standby disk for a previous disk group. IO load is focused on a disk in one disk group, so that a requirement for processing the IO service is satisfied by using this group of disks. In addition, the another disk group may save energy or sleep, so that more energy consumption can be reduced. Moreover, resource pools of different levels are implemented by using a plurality of disk groups. When a disk in a previous disk group is in shortage, a capacity of the previous disk group can be expanded by using a next disk group. Therefore, according to the method, more precise energy-saving control is implemented, and an energy-saving effect is improved.

Optionally, the second disk group includes a hot standby disk group and a cold standby disk group. The hot standby disk group is in a hot standby state, and a wakeup latency corresponding to the hot standby state is lower than a latency threshold. The cold standby disk group is in a cold standby state, and power consumption corresponding to the cold standby state is less than a power consumption threshold.

The standby disk group is further divided into the hot standby disk group and the cold standby disk group, so that the hot standby disk group can be used as a hot standby for the first disk group, and the cold standby disk group can be used as a resource pool for the hot standby disk group. This refines a disk grouping manner and helps implement precise energy-saving control.

Optionally, the first disk group includes a hot disk group and a cold disk group. An access frequency of data stored in the hot disk group is greater than a frequency threshold; and an access frequency of data stored in the cold disk group is less than a frequency threshold.

The first disk group used for data read/write is further divided into the hot disk group and the cold disk group, so that hot data is centrally stored in the hot disk group, and cold data and warm data are centrally stored in the cold disk group. This refines a disk grouping manner and helps implement precise energy-saving control.

Optionally, the storage system further includes a controller. The controller is configured to determine IO load of the storage system in a future time period. The IO load is used to indicate processing pressure of performing a read operation or a write operation by the storage system. The controller is further configured to group, based on the IO load, a plurality of disks included in the storage system, to obtain the first disk group, the second disk group, and the third disk group.

Because the IO load of the storage system in the future time period is predicted, disks are grouped based on the future IO load, so that a disk group-based energy-saving control manner matches the future IO load. This implements precise energy-saving control and helps implement on-demand power supply.

Optionally, the grouping, based on the IO load, a plurality of disks included in the storage system specifically includes:

The controller is configured to determine, based on the IO load, a plurality of candidate grouping manners and a benefit parameter of each candidate grouping manner. The benefit parameter is used to indicate energy consumption that can be reduced in the candidate grouping manner. The controller is configured to determine a target grouping manner from the plurality of candidate grouping manners based on the benefit parameter of each candidate grouping manner. The target grouping manner has a largest benefit parameter. The controller is configured to group, in the target grouping manner, the plurality of disks included in the storage system.

The disks are grouped based on the largest benefit parameter. This effectively solves a problem that a low energy-saving benefit is caused by disk sleep triggered by a fixed threshold or a scheduled task, and maximizes an energy-saving benefit.

Optionally, the grouping, based on the IO load, a plurality of disks included in the storage system specifically includes:

If the IO load is higher than a load threshold, the controller groups, in a first grouping manner, the plurality of disks included in the storage system. If the IO load is lower than the load threshold, the controller groups, in a second grouping manner, the plurality of disks included in the storage system. A quantity of disks in a first disk group in the second grouping manner is less than a quantity of disks in a first disk group in the first grouping manner, and a quantity of disks in a third disk group in the second grouping manner is greater than a quantity of disks in a third disk group in the first grouping manner.

In this manner, on one hand, when it is identified that the storage system is about to face high IO load, more disks is divided into the first disk group in advance, so that when an IO request arrives, more disks can be used to respond to a service data read/write request in a timely manner. On the other hand, when it is identified that the storage system is about to face low IO load, more disks may be divided into the third disk group in advance, so that more disks sleep during a service off-peak period. Therefore, in the foregoing implementation, that an energy-saving measure of the storage system matches the IO load is ensured. This effectively solves a problem that service performance is affected because a storage product triggers disk sleep by using a fixed threshold or a scheduled task, implements precise energy-saving control, and helps implement on-demand power supply.

Optionally, the controller is further configured to perform at least one of the following:

The controller adjusts, if IO load of the storage system changes, a disk group to which a disk in the storage system belongs.

Alternatively, the controller adjusts, if an indicator of the storage system does not meet a condition, a disk group to which a disk in the storage system belongs. The indicator includes at least one of a service level agreement (SLA) indicator, a performance indicator, or a reliability indicator.

Alternatively, the controller adjusts, if a quantity of disks included in the first disk group, the second disk group, or the third disk group does not meet a condition, a disk group to which a disk in the storage system belongs.

A disk group to which a disk belongs is dynamically switched, and a quantity of disks in each disk group is dynamically variable. This improves flexibility of disk grouping. Especially, when it is predicted that the IO load decreases greatly in the future time period and that data stored on a disk is not read or written for a long time, a disk in each disk group is switched to a next disk group, group by group. In this way, the disk grouping manner is adaptively adjusted based on the change of the IO load, and a disk precisely sleep as the service decreases. This helps improve an energy-saving benefit and maximally reduce power consumption of a storage disk array.

Optionally, that the controller adjusts, if IO load of the storage system changes, a disk group to which a disk in the storage system belongs includes:

If IO load of the first disk group increases, the controller switches at least one disk in the second disk group to the first disk group.

If IO load of the first disk group decreases, the controller switches at least one disk in the first disk group to the second disk group.

If IO load of the second disk group increases, the controller switches at least one disk in the third disk group to the second disk group.

If IO load of the second disk group decreases, the controller switches at least one disk in the second disk group to the third disk group.

Optionally, that the controller adjusts, if an indicator of the storage system does not meet a condition, a disk group to which a disk in the storage system belongs includes:

If the indicator of the storage system does not meet the condition, the controller switches at least one disk in the second disk group to the first disk group, and switches at least one disk in the third disk group to the second disk group.

Optionally, that the controller adjusts, if a quantity of disks included in the first disk group, the second disk group, or the third disk group does not meet a condition, a disk group to which a disk in the storage system belongs includes:

If the quantity of disks included in the first disk group is less than a quantity threshold, the controller switches at least one disk in the second disk group to the first disk group.

If the quantity of disks included in the second disk group is less than a quantity threshold, the controller switches at least one disk in the third disk group to the second disk group.

According to a second aspect, an energy-saving control method is provided. The method is applied to a storage system, and the storage system includes a first disk group, a second disk group, and a third disk group. The method includes:

The first disk group processes an IO service.

The second disk group provides a standby disk for the first disk group, and the second disk group is in an energy-saving state.

The third disk group provides a standby disk for the second disk group, and the third disk group is in a sleep state.

Optionally, the second disk group includes a hot standby disk group and a cold standby disk group.

The hot standby disk group is in a hot standby state, and a wakeup latency corresponding to the hot standby state is lower than a latency threshold.

The cold standby disk group is in a cold standby state, and power consumption corresponding to the cold standby state is less than a power consumption threshold.

Optionally, the first disk group includes a hot disk group and a cold disk group.

An access frequency of data stored in the hot disk group is greater than a frequency threshold.

An access frequency of data stored in the cold disk group is less than a frequency threshold.

Optionally, the storage system further includes a controller.

The controller determines IO load of the storage system in a future time period. The IO load is used to indicate processing pressure of performing a read operation or a write operation by the storage system.

The controller groups, based on the IO load, a plurality of disks included in the storage system, to obtain the first disk group, the second disk group, and the third disk group.

Optionally, the grouping, based on the IO load, a plurality of disks included in the storage system specifically includes:

The controller determines a plurality of candidate grouping manners and a benefit parameter of each candidate grouping manner based on the IO load. The benefit parameter is used to indicate energy consumption that can be reduced in the candidate grouping manner.

The controller determines a target grouping manner from the plurality of candidate grouping manners based on the benefit parameter of each candidate grouping manner. The target grouping manner has a largest benefit parameter.

The controller groups, in the target grouping manner, the plurality of disks included in the storage system.

Optionally, the grouping, based on the IO load, a plurality of disks included in the storage system specifically includes:

If the IO load is higher than a load threshold, the controller groups, in a first grouping manner, the plurality of disks included in the storage system.

If the IO load is lower than the load threshold, the controller groups, in a second grouping manner, the plurality of disks included in the storage system. A quantity of disks in a first disk group in the second grouping manner is less than a quantity of disks in a first disk group in the first grouping manner, and a quantity of disks in a third disk group in the second grouping manner is greater than a quantity of disks in a third disk group in the first grouping manner.

Optionally, the method further includes at least one of the following:

The controller adjusts, if IO load of the storage system changes, a disk group to which a disk in the storage system belongs.

Alternatively, the controller adjusts, if an indicator of the storage system does not meet a condition, a disk group to which a disk in the storage system belongs. The indicator includes at least one of an SLA indicator, a performance indicator, or a reliability indicator.

Alternatively, the controller adjusts, if a quantity of disks included in the first disk group, the second disk group, or the third disk group does not meet a condition, a disk group to which a disk in the storage system belongs.

Optionally, that the controller adjusts, if IO load of the storage system changes, a disk group to which a disk in the storage system belongs includes:

If IO load of the first disk group increases, the controller switches at least one disk in the second disk group to the first disk group.

If IO load of the first disk group decreases, the controller switches at least one disk in the first disk group to the second disk group.

If IO load of the second disk group increases, the controller switches at least one disk in the third disk group to the second disk group.

If IO load of the second disk group decreases, the controller switches at least one disk in the second disk group to the third disk group.

Optionally, that the controller adjusts, if an indicator of the storage system does not meet a condition, a disk group to which a disk in the storage system belongs includes:

If the indicator of the storage system does not meet the condition, the controller switches at least one disk in the second disk group to the first disk group, and switches at least one disk in the third disk group to the second disk group.

Optionally, that the controller adjusts, if a quantity of disks included in the first disk group, the second disk group, or the third disk group does not meet a condition, a disk group to which a disk in the storage system belongs includes:

If the quantity of disks included in the first disk group is less than a quantity threshold, the controller switches at least one disk in the second disk group to the first disk group.

If the quantity of disks included in the second disk group is less than a quantity threshold, the controller switches at least one disk in the third disk group to the second disk group.

According to a third aspect, a computer-readable storage medium is provided. The storage medium stores at least one instruction, and the instruction is read by a processor, to enable a storage system to perform the energy-saving control method provided in any one of the first aspect or the optional manners of the first aspect.

According to a fourth aspect, a computer program product is provided. The computer program product includes computer instructions, and the computer instructions are stored in a computer-readable storage medium. A processor of a storage system reads the computer instructions from the computer-readable storage medium, and the processor executes the computer instructions, to enable the storage system to perform the energy-saving control method provided in any one of the first aspect or the optional manners of the first aspect.

According to a fifth aspect, a storage system is provided. The storage system has a function of implementing any one of the first aspect or the optional manners of the first aspect. The storage system includes at least one module, and the at least one module is configured to implement the energy-saving control method provided in any one of the first aspect or the optional manners of the first aspect. For specific details of the storage system provided in the fifth aspect, refer to any one of the first aspect or the optional manners of the first aspect. Details are not described herein again.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Because some embodiments of this application relate to an energy-saving technology of a storage system, for ease of understanding, the following first briefly describes the energy-saving technology of the storage system.

Usually, hardware of a storage system includes a processor, a disk, a fan, a power supply, and the like. Power consumption of the disk accounts for more than 70%. The disk is a main power-consuming component of the storage system and is in urgent need of energy-saving design improvement.

Some embodiments of this application provide a method for implementing energy saving of the storage system. Disks are grouped to implement resource pools of different levels. Some disk groups are controlled to process an IO service, and other disk groups are controlled to sleep, to avoid a problem that service performance is affected by disk sleep triggered by a fixed threshold or a scheduled task, and implement precise energy-saving control. The following describes embodiments in detail from a plurality of perspectives such as a system architecture, an internal structure of a storage system, a method procedure, and a logical function architecture.

The method provided in the embodiments can be used in a distributed storage system or a centralized storage system. The following separately describes the two application scenarios.

Application Scenario 1: Distributed Storage System

Figure 1:
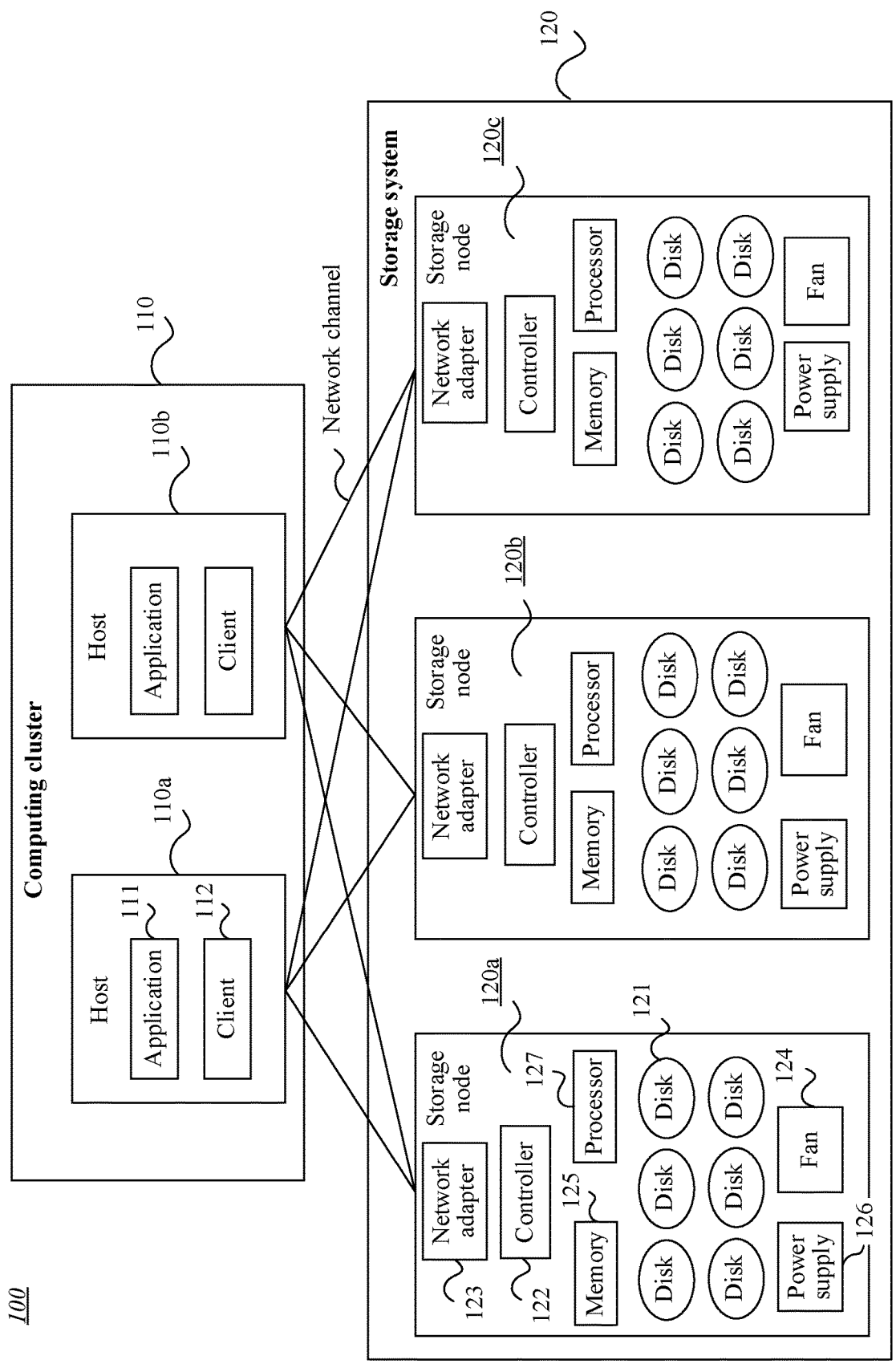
FIG. 1 is a schematic diagram of a system architecture according to an embodiment of this application.

Refer to FIG. 1. This embodiment provides a system architecture 100. The system architecture 100 is an example description for an application scenario of a distributed storage system. The system architecture 100 includes a computing cluster 110 and a storage system 120. The computing cluster 110 communicates with the storage system 120.

The computing cluster 110 includes a plurality of computing nodes (CNs). The computing node includes an application 11 and a client 112. The computing node has a plurality of forms. For example, the computing node is a host, a server, a personal computer, or another device having a computing processing capability. For example, as shown in FIG. 1, the computing cluster 110 includes a host 110a and a host 110b. Different computing nodes in the computing cluster 110 are connected to each other by using a wired network or a wireless network. Different computing nodes in the computing cluster 110 may be distributed at different locations or a same location.

The storage system 120 includes a plurality of storage nodes (Data Node (DN)). For example, as shown in FIG. 1, the storage system 120 includes a storage node 120a, a storage node 120b, and a storage node 120c. Different storage nodes in the storage system 120 may be distributed at different locations or a same location. Different storage nodes in the storage system 120 are interconnected by using a high-speed network.

The storage node is configured to carry a storage service of an application in the computing node, and respond to an IO request of the computing node. For example, when the computing node needs to access service data stored on the storage node, the computing node sends a read request to the storage node. In response to the read request, the storage node reads the service data from a disk, and sends the service data to the computing node. For example, when the computing node needs to store service data, the computing node sends a write request to the storage node, and the storage node stores the service data in a disk in response to the write request.

In another implementation, the computing cluster is converged with the storage system, that is, the storage node is converged with the computing node. One physical node includes both the computing node and the storage node.

In the scenario of the distributed storage system, the storage system also includes a controller, configured to manage a storage resource. Specific implementation may be implemented by a device running corresponding software, and the device may be the storage node.

Application Scenario 2: Centralized Storage System

The centralized storage system is, for example, a storage array. The centralized storage system includes one or more controllers and one or more disks. The controller in the storage system is also referred to as a storage array controller. The centralized storage system communicates with a host.

Figure 2:
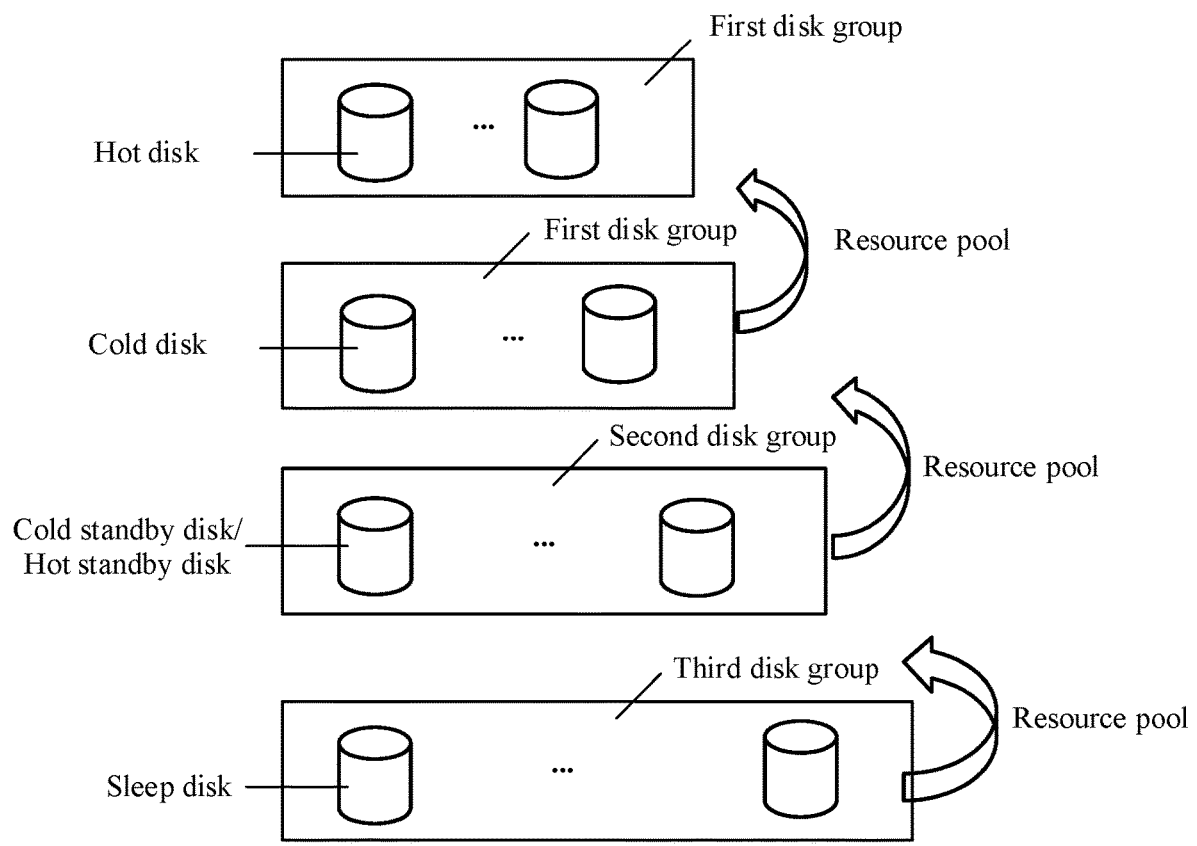
FIG. 2 is a schematic diagram of disk grouping according to an embodiment of this application.
Figure 3:
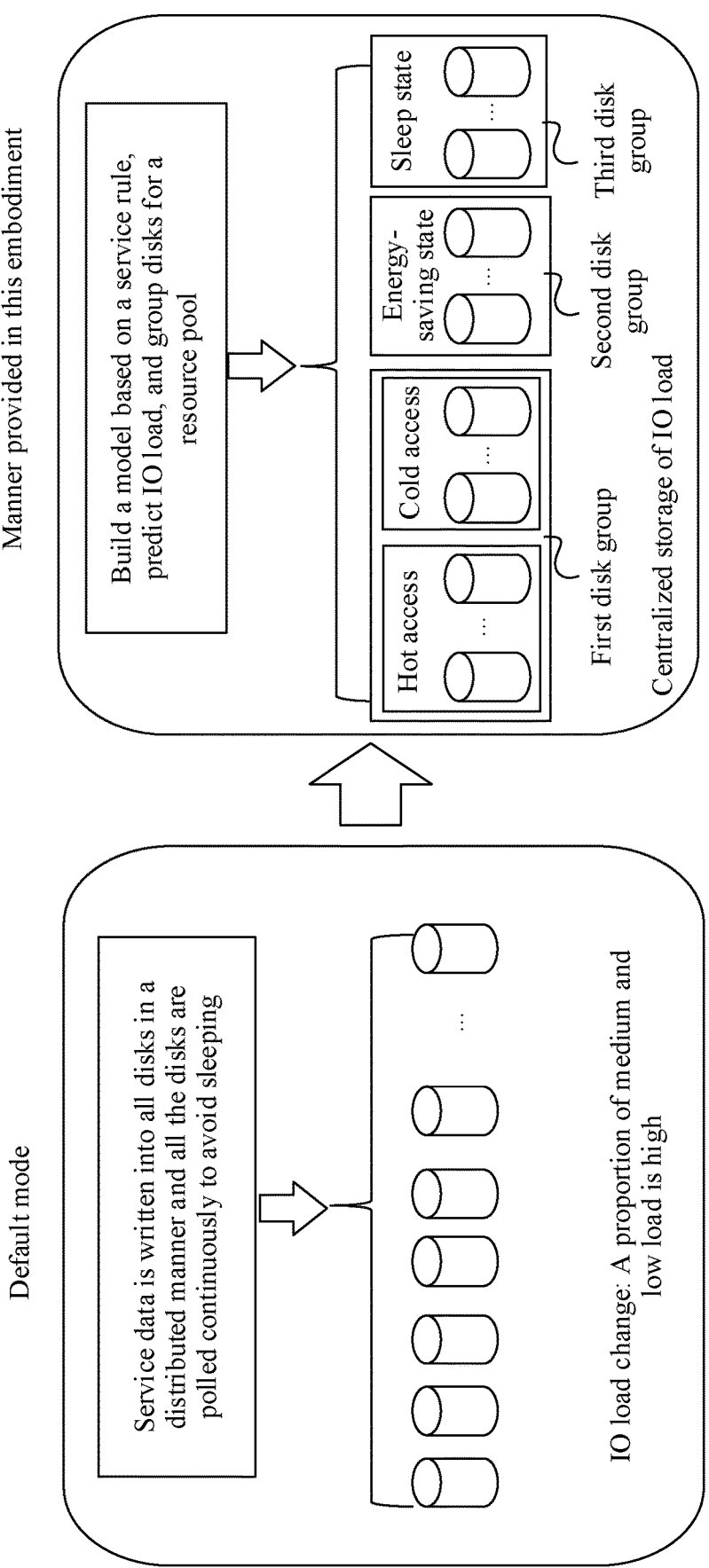
FIG. 3 is a schematic diagram of disk grouping according to an embodiment of this application.

The following describes an internal structure of a storage system with reference to FIG. 1, FIG. 2, and FIG. 3.

An embodiment of this application provides a storage system. For example, the storage system is a distributed storage system, and as shown in FIG. 1, includes the storage node 120a, the storage node 120b, and the storage node 120c. For another example, the storage system is a centralized storage system.

The storage system includes a plurality of disks. The disk includes but is not limited to a solid state drive (SSD), a hard disk drive (HDD), and the like. A specific type of the disk is not limited in this embodiment. For example, as shown in FIG. 1, the storage node 120a is an example description for a storage system, and a disk 121 in the storage node 120a is an example description for a disk in the storage system.

A plurality of disks are divided into corresponding disk groups. Therefore, the storage system has a plurality of disk groups. As shown in FIG. 2, each of the plurality of disk groups implements one resource pool. Specifically, in the plurality of disk groups except the $1^{st}$ disk group, each disk group is configured to provide a standby disk for a previous disk group. If a disk in a previous disk group is in shortage, at least one disk in a next disk group is switched to the previous disk group, so that a quantity of disks in the previous disk group increases. In this way, a capacity of the previous disk group is expanded by using the next disk group, the disk in the previous disk group is supplemented, and shortage of a disk resource in the previous disk group is relieved.

Different disk groups in the plurality of disk groups have different working statuses. Power consumption of a single disk in a next disk group is less than that of a single disk in a previous disk group. A wakeup latency of a previous disk group is lower than that of a next disk group.

With reference to (1), (2), and (3), the following uses a first disk group, a second disk group, and a third disk group as examples to describe the plurality of disk groups.

(1) First Disk Group

A disk in the first disk group is also referred to as a read/write disk or a first-level disk. The first disk group is, for example, the $1^{st}$ disk group in the plurality of disk groups. The first disk group includes at least one disk. In some embodiments, the first disk group is a disk group having a lowest wakeup latency in the plurality of disk groups. In some embodiments, the first disk group is a disk group having a largest data access frequency in the plurality of disk groups.

In some embodiments, each disk in the first disk group is in a normal state. Optionally, the normal state is a state in which an energy-saving mode is disabled. Optionally, the normal state is a state in which immediately reading is supported.

The first disk group is configured to process an IO service. The storage system performs a data read/write operation by using the first disk group, to allocate IO load to the first disk group. For example, when receiving a storage request, the storage system obtains service data from the storage request, and writes the service data into the disk in the first disk group, to store the service data by using the disk in the first disk group.

Refer to FIG. 3. IO load of the storage system changes, in an improvement manner by providing the first disk group, from being distributed to all disks to being focused on the first disk group. Therefore, IO load of another disk group other than the first disk group is reduced. This helps the another disk group save energy or sleep.

In some embodiments, the first disk group includes a hot disk group and a cold disk group. The following uses (1.1) and (1.2) as examples to describe the hot disk group and the cold disk group.

(1.1) Hot Disk Group

The hot disk group includes at least one disk. The disk in the hot disk group is also referred to as a hot disk. Data stored in the hot disk group includes hot data, and the hot data is data whose access frequency is greater than a frequency threshold. The hot disk group frequently performs a data read/write operation. In some embodiments, a wakeup latency of a disk in the hot disk group is lower than a wakeup latency of a disk in the cold disk group.

(1.2) Cold Disk Group

The cold disk group includes at least one disk. The disk in the cold disk group is also referred to as a cold disk. Data stored in the cold disk group includes at least one of warm data or cold data, and an access frequency of the warm data or the cold data is less than a frequency threshold. The cold disk group intermittently performs a data read/write operation. In some embodiments, power consumption of a disk in the cold disk group is less than power consumption of a disk in the hot disk group.

In some embodiments, the cold disk group is configured to provide a standby disk for the hot disk group. Specifically, the cold disk group is used as a resource pool of the hot disk group. When the disk in the hot disk group is in shortage, at least one disk in the cold disk group is switched to the hot disk group, so that a quantity of disks in the hot disk group increases, and a capacity of the hot disk group is expanded.

(2) Second Disk Group

The second disk group includes at least one disk. The disk in the second disk group is also referred to as a standby disk or a second-level disk. In some embodiments, the second disk group is a disk group having a second lowest wakeup latency in the plurality of disk groups. To be specific, the wakeup latency of the second disk group is higher than the wakeup latency of the first disk group, and the wakeup latency of the second disk group is lower than a wakeup latency of another disk group other than the first disk group. In some embodiments, power consumption of a single disk in the second disk group is less than that of a single disk in the first disk group.

In some embodiments, the second disk group enables an energy-saving mode, and each disk in the second disk group is in an energy-saving state. The energy-saving state is a working status in which power consumption is less than that in a normal state. The energy-saving state includes but is not limited to at least one of an idle state and a standby state. The idle state includes but is not limited to at least one of an idle state A (Idle_A), an idle state B (Idle_B), and an idle state C (Idle_CA). The standby state includes but is not limited to at least one of a standby state Y (Standby_Y) and a standby state Z (Standby_Z).

The second disk group is configured to provide a standby disk for the first disk group. Specifically, the second disk group is used as a resource pool of the first disk group. When the disk in the first disk group is in shortage, at least one disk in the second disk group is switched to the first disk group, so that a quantity of disks in the first disk group increases, and a capacity of the first disk group is expanded.

In some embodiments, the second disk group includes a hot standby disk group and a cold standby disk group. The following uses (2.1) and (2.2) as examples to describe the hot standby disk group and the cold standby disk group.

(2.1) Hot Standby Disk Group

The hot standby disk group is in a hot standby state. A wakeup latency corresponding to the hot standby state is lower than a latency threshold. In some embodiments, a wakeup latency corresponding to the hot standby disk group is lower than a wakeup latency corresponding to the cold standby disk group. Therefore, the hot standby disk group responds to a read/write request faster than the cold standby disk group.

In some embodiments, that "the second disk group is configured to provide a standby disk for the first disk group" described above includes: The hot standby disk group in the second disk group is configured to provide the standby disk for the first disk group. In other words, the hot standby disk group is specifically used as a resource pool of the first disk group. When the disk in the first disk group is in shortage, at least one disk in the hot standby disk group is switched to the first disk group.

(2.2) Cold Standby Disk Group

The cold standby disk group is in a cold standby state. Power consumption corresponding to the cold standby state is less than a power consumption threshold. In some embodiments, power consumption corresponding to the cold standby disk group is less than power consumption corresponding to the hot standby disk group. Therefore, the cold standby disk group reduces more power consumption than the hot standby disk group.

In some embodiments, the cold standby disk group is configured to provide a standby disk for the hot standby disk group. The cold standby disk group functions as a resource pool of the hot standby disk group. When the disk in the hot standby disk group is in shortage, at least one disk in the cold standby disk group is switched to the hot standby disk group, so that a quantity of disks in the hot standby disk group increases, and a capacity of the hot standby disk group is expanded.

(3) Third Disk Group

The third disk group includes at least one disk. The disk in the third disk group is also referred to as a sleep disk or a third-level disk. In some embodiments, the third disk group is a disk group having smallest power consumption in the plurality of disk groups. In some embodiments, the third disk group is a disk group having a smallest data access frequency in the plurality of disk groups.

In some embodiments, the third disk group enables a sleep mode, and each disk in the third disk group is in a sleep state.

The third disk group is configured to provide a standby disk for the second disk group. Specifically, the third disk group is used as a resource pool of the second disk group. When the disk in the second disk group is in shortage, at least one disk in the third disk group is switched to the second disk group, so that a quantity of disks in the second disk group increases, and a capacity of the second disk group is expanded.

It should be understood that a quantity of disk groups in the storage system is not limited in this embodiment. The first disk group, the second disk group, and the third disk group described above are example division manners. In some other embodiments, the storage system further includes another disk group other than the first disk group, the second disk group, and the third disk group. More disk groups are used to implement resource pools of more levels, so as to facilitate more precise energy-saving control.

It should be understood that a quantity of disks included in each disk group is not limited in this embodiment. In some embodiments, one disk group of the first disk group, the second disk group, and the third disk group includes only one disk, or one disk group of the first disk group, the second disk group, and the third disk group includes dozens, hundreds, or more disks.

It should be understood that whether quantities of disks included in different disk groups are the same is not limited in this embodiment. In some embodiments, the first disk group, the second disk group, and the third disk group have different quantities of disks. In some embodiments, the first disk group, the second disk group, and the third disk group have a same quantity of disks.

According to the storage system provided in this embodiment, the disks are grouped. One disk group processes an IO service, and another disk group is in an energy-saving state or a sleep state and provides a standby disk for a previous disk group. IO load is focused on a disk in one disk group, so that a requirement for processing the IO service is satisfied by using this group of disks. In addition, the another disk group may save energy or sleep, so that more energy consumption can be reduced. Moreover, resource pools of different levels are implemented by using the plurality of disk groups. When a disk in a previous disk group is in shortage, a capacity of the previous disk group can be expanded by using a next disk group. Therefore, according to the method, more precise energy-saving control is implemented, and an energy-saving effect is improved.

In some embodiments, the storage system further includes a controller. The following uses (4) as an example to describe the controller.

(4) Controller

The controller is configured to group the plurality of disks included in the storage system, to obtain the first disk group, the second disk group, and the third disk group. For example, the controller determines, by using a disk grouping algorithm, a quantity of disk groups, a quantity of disks in each disk group, and a disk group to which each disk belongs, to divide each disk in the storage system into the first disk group, the second disk group, or the third disk group.

The controller and the disk have a plurality of location relationships. In some embodiments, the controller and the disk are disposed in a separate manner, and the controller is located outside the disk. For example, as shown in FIG. 1, a controller 122 in the storage node 120a is an example description for a controller outside a disk. In some other embodiments, the controller and the disk are disposed in an integrated manner, and the controller is located inside the disk. In some embodiments, the controller is connected to the disk by using a high-speed interconnect network, and the controller communicates with the disk by using the high-speed interconnect network. The high-speed interconnection network is, for example, a peripheral component interconnect express (PCIe) bus, a high-speed Ethernet, InfiniBand (IB), or a fibre channel (FC).

In some embodiments, after the controller performs grouping, the controller sends a control instruction to each disk group. The control instruction instructs the disk group to enter a corresponding working status, and the control instruction includes, for example, an identifier of the working status. Each disk in the disk group receives the control instruction and enters the corresponding working status according to the control instruction, so that energy-saving control is implemented. For example, the controller sends a first instruction to each disk in the first disk group, and the first instruction instructs to enter a normal state. The controller sends a second instruction to each disk in the second disk group, and the second instruction instructs to enter an energy-saving state. The controller sends a third instruction to each disk in the third disk group, and the third instruction instructs to enter a sleep state.

The disks are grouped by the controller in a plurality of manners. The following uses S201 to S202 as an example for description.

S201: The controller determines IO load of the storage system in a future time period.

The IO load is also referred to as service load. The IO load is used to indicate processing pressure of performing a read operation or a write operation by the storage system. Optionally, the IO load is represented in a form of a value, a vector, a matrix, or other data. Optionally, the IO load is represented by using resource usage, a used resource amount, or a remaining resource amount of the storage system. A resource includes but is not limited to at least one of a computing resource (such as a CPU), a storage resource (such as a memory and a disk), and a network resource (such as a network adapter and bandwidth). Optionally, the IO load is represented by at least one of the following (a) to (d):

(a) CPU usage;
(b) memory usage;
(c) at least one of disk bandwidth, network adapter bandwidth, IP frame bandwidth, or a throughput; and
(d) IO read/write data, including but not limited to at least one of (d-1) to (d-4) below:
 (d-1) input output per second (IOPS);
 (d-2) size of an access request received in a unit time period;
 (d-3) a read/write ratio of an input/output (IO) request received in a unit time period, where the read/write ratio includes at least one of a ratio of a read request to an IO request or a ratio of a write request to an IO request; and
 (d-4) a largest data volume of an access request or an average data volume of access requests received in a unit time period.

The future time period is, for example, a next time period of a current time period, for example, a next minute of the current time period. An action of determining the IO load in the future time period is prediction of the IO load.

The IO load is predicted by the storage system in a plurality of manners. In some embodiments, the storage system inputs historical IO load data into a prediction model, and processes the historical IO load data by using the prediction model, to output the IO load in the future time period.

The historical IO load data is also referred to as a historical parameter. The historical IO load data is used to indicate IO load of the storage system in a historical time period. In some embodiments, the storage system collects at least one of (a) to (d) in historical running, to obtain the historical IO load data. The historical IO load data is obtained in a plurality of specific manners. For example, parameters such as storage service IO read/write data, CPU usage, and memory usage are continuously monitored by using a system process or out-of-band management software of the storage system, to obtain the historical IO load data.

Figure 4:
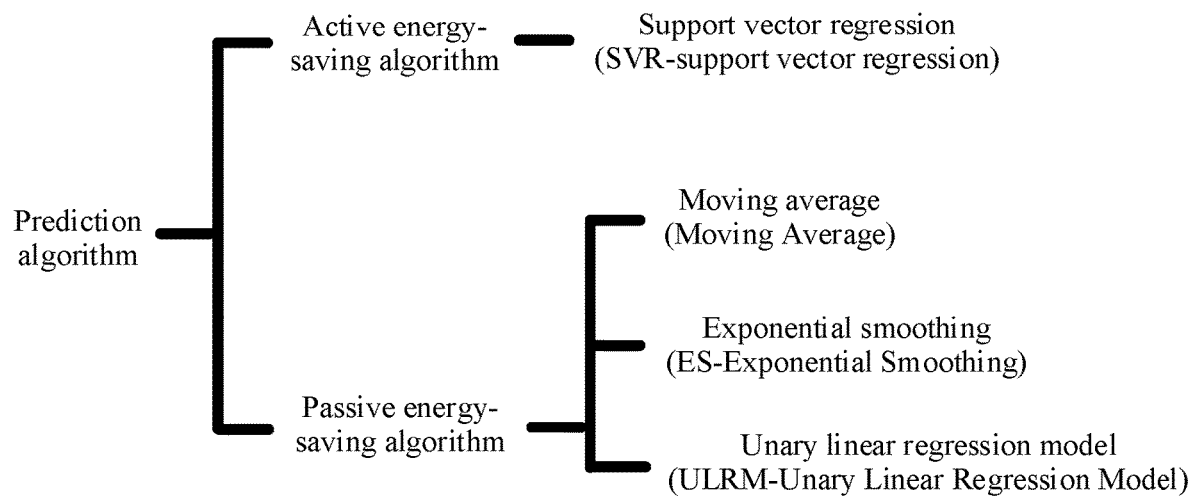
FIG. 4 is a schematic diagram of a prediction algorithm according to an embodiment of this application.

The prediction model is also referred to as a trend prediction model or a load prediction model. The prediction model is used to identify a change trend of the IO load based on the historical IO load data, to predict the IO load in the future time period. In some embodiments, the prediction model includes a plurality of time dimensions, and duration of future time periods corresponding to different time dimensions is different. For example, the prediction model includes but is not limited to at least one of a long-period prediction model and a short-period prediction model. Duration of a future time period predicted by the long-period prediction model is greater than preset duration. Duration of a future time period predicted by the short-period prediction model is less than the preset duration. The prediction model is established, for example, by using a prediction algorithm. The prediction algorithm for implementing the prediction model includes a plurality of specific implementations. In some embodiments, a clustering algorithm is used to establish a prediction model. The clustering algorithm is, for example, a k-means algorithm. Refer to FIG. 4. In some embodiments, the prediction model is established by using a time series prediction algorithm. The time series prediction algorithm includes but is not limited to a moving average method, an exponential smoothing (ES) method, and the like. In some other embodiments, the prediction model is established by using a machine learning algorithm. The machine learning algorithm includes but is not limited to support vector regression (SVR), unary linear regression model (ULRM), a logistic regression algorithm, a deep learning algorithm, and the like. The deep learning algorithm includes but is not limited to a convolutional neural network, a long short-term memory (LSTM) network, and the like. In some embodiments, the prediction model is constructed by using a conventional component-based overhead modeling method. In some embodiments, the prediction model is a classification model. The prediction model is used to predict a type of the IO load in the future time period based on the historical IO load data.

For example, a type of IO load is classified based on a threshold interval to which the IO load belongs, and IO load in different threshold intervals corresponds to different types of IO load. For example, the type of the IO load includes but is not limited to at least one of a hot data type, a warm data type, and a cold data type. A threshold interval to which IO load of the hot data type belongs is higher than a threshold interval to which IO load of the warm data type belongs. The threshold interval to which the IO load of the warm data type belongs is higher than a threshold interval to which IO load of the cold data type belongs. It should be understood that the hot data type, the warm data type, and the cold data type are an example of a classification manner. A specific classification manner of IO load and a specific type of IO load may be adjusted based on an actual situation. Neither the classification manner of IO load nor the type of IO load is limited in this embodiment.

In some embodiments, the prediction model includes a plurality of sub-models. Each sub-model corresponds to a type of IO load. Each sub-model is used to predict IO load in the future time period based on historical IO load data of a corresponding type of IO load. In some embodiments, different sub-models have a same structure but different parameters; or different sub-models have different structures. In this manner, differentiated modeling can be performed based on different types of IO load, to more accurately analyze IO load at a next moment.

Figure 5:
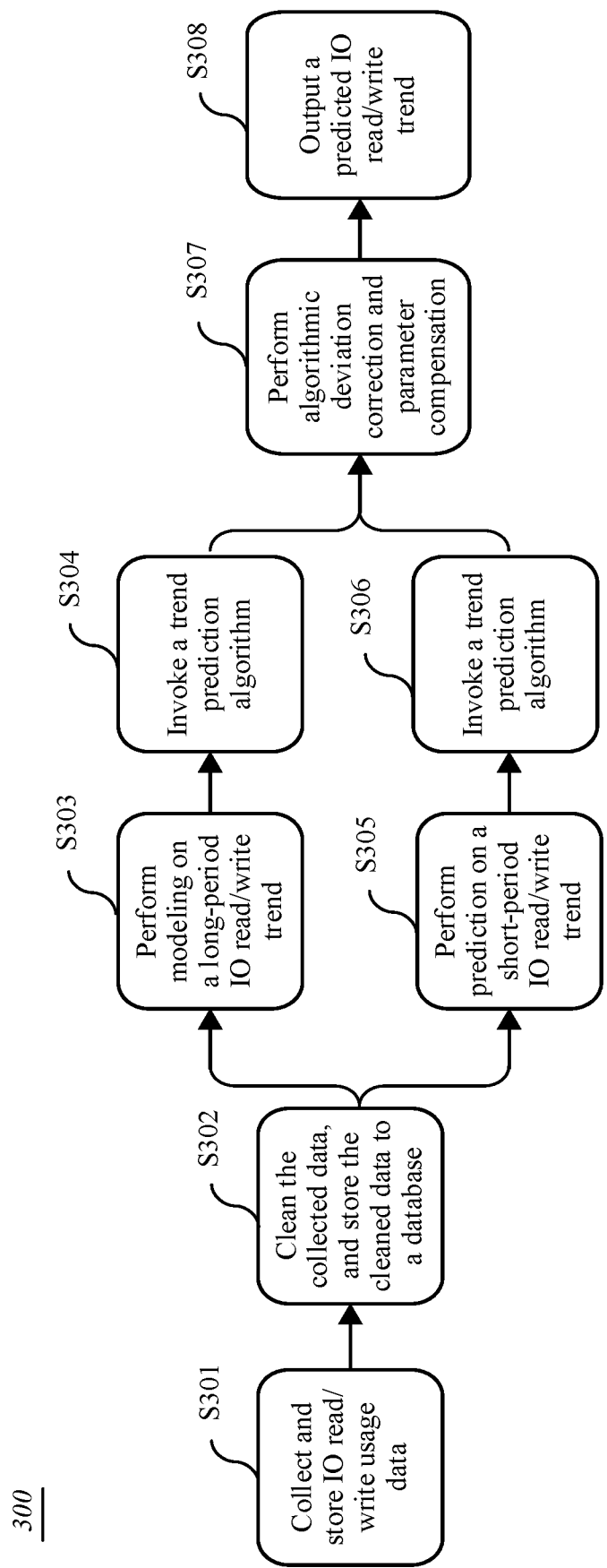
FIG. 5 is a flowchart of an IO load prediction method according to an embodiment of this application.

Refer to FIG. 5. The following uses a method 300 as an example to describe a process of predicting IO load. In the method 300, historical IO load data includes CPU usage, memory usage, and IO read/write data, and a prediction model includes but is not limited to a long-period prediction model and a short-period prediction model. The method 300 includes S301 to S308.

S301: Collect IO read/write, CPU usage, and memory usage of a storage system, and perform the following S302.

S302: Clean the collected data, store the cleaned data to a database, and perform the following S303 or S305.

S303: Perform modeling on a long-period IO read/write trend to obtain a long-period prediction model, and perform the following S304.

S304: Invoke a trend prediction algorithm to train a parameter in the long-period prediction model, and perform the following S307.

S305: Perform modeling on a short-period IO read/write trend to obtain a short-period prediction model, and perform the following S306.

S306: Invoke a trend prediction algorithm to train a parameter in the short-period prediction model, and perform the following S307.

S307: Correct or compensate for a deviation of the parameter in the long-period prediction model or in the short-period prediction model by using an algorithm, and perform the following S308.

S308: Output a predicted IO read/write trend by using the long-period prediction model or the short-period prediction model.

In some embodiments, after determining the IO load in the future time period, the controller determines, based on a value of the IO load, whether to perform the following S202. If the IO load is lower than a load threshold, the following S202 is performed; or if the IO load is higher than the load threshold, the following S202 is not performed. If a type of IO load is a hot data type, for example, if the IO load is high-bandwidth hot data access, all disks of the storage system need to be used to meet a performance requirement. In this case, group sleep of the disks is not triggered. If a type of IO load is a warm data type or a cold data type, and a disk resource is sufficient, S202 is performed to trigger group sleep of the disks.

S202: The controller groups, based on the IO load, the plurality of disks included in the storage system, to obtain the first disk group, the second disk group, and the third disk group.

In some embodiments, the controller determines a grouping manner based on a type of the IO load, and the controller groups the disks in the determined grouping manner. The grouping manner includes but is not limited to at least one of a quantity of disk groups, a quantity of disks in each disk group, and a trigger condition for switching between different disk groups.

In some embodiments, different types of IO load correspond to different grouping manners. For example, in a case of high IO load, the first disk group (read/write disk group) has a large quantity of disks, and the third disk group (sleep disk group) has a small quantity of disks. In a case of low IO load, the first disk group (read/write disk group) has a small quantity of disks, and the third disk group (sleep disk group) has a large quantity of disks.

For example, the controller determines whether the IO load is higher than the load threshold. If the IO load is higher than the load threshold, the controller groups the plurality of disks in a first grouping manner. If the IO load is lower than the load threshold, the controller groups the plurality of disks in a second grouping manner. A quantity of disks in a first disk group in the second grouping manner is less than a quantity of disks in a first disk group in the first grouping manner, and a quantity of disks in a third disk group in the second grouping manner is greater than a quantity of disks in a third disk group in the first grouping manner. For example, the storage system includes 100 disks in total. If the controller predicts that a type of IO load is a hot data type, for example, the IO load is load generated by a hot storage application that frequently reads/writes data, such as a big data application, the controller determines a grouping manner as follows: dividing 60 disks into a hot disk group; dividing 20 disks into a hot standby disk group; and dividing 20 disks into a cold standby disk group. If the controller predicts that a type of IO load is a cold data type, for example, the IO load is a load generated by a cold storage application that has a small quantity of data read/write times and a long data read/write interval, such as data backup, the controller determines a grouping manner as follows: dividing 10 disks into a hot disk group; dividing 10 disks into a hot standby disk group; dividing 10 disks into a cold standby disk group; and dividing 70 disks into the third disk group (sleep disk group).

In some embodiments, the controller divides a disk into a corresponding disk group based on an access frequency of data stored in the disk. For example, the controller determines, based on a historical access frequency of data stored in a disk, an access frequency of the data stored in the disk in a future time period, and divides the disk into a corresponding disk group based on the access frequency in the future time period. For example, if the storage system includes a disk A, and the controller predicts that data stored in the disk A is to be accessed recently, the controller divides the disk A into a hot disk group. For another example, if the storage system includes a disk B, and the controller predicts that data stored in the disk B is not to be accessed in a future time period, the controller divides the disk B into the third disk group.

Because IO load of a storage system often fluctuates greatly, how to ensure that an energy-saving measure of the storage system matches the IO load becomes an urgent problem to be solved. In the foregoing implementation, the IO load of the storage system in the future time period is predicted, and the disks are grouped based on the future IO load. On one hand, when it is identified that the storage system is about to face high IO load, more disks may be divided into the first disk group in advance, so that when an IO request arrives, more disks can be used to respond to a service data read/write request in a timely manner. On the other hand, when it is identified that the storage system is about to face low IO load, more disks may be divided into the third disk group in advance, so that more disks sleep during a service off-peak period. Therefore, in the foregoing implementation, that an energy-saving measure of the storage system matches the IO load is ensured. This effectively solves a problem that service performance is affected because a storage product triggers disk sleep by using a fixed threshold or a scheduled task, implements precise energy-saving control, and helps implement on-demand power supply.

In some embodiments, when the disks are grouped, more than IO load is used, and other data is used. For example, a proper quantity of disks in each disk group is calculated based on a hardware configuration, a type of IO load, an IO prediction trend, an SLA, and a reliability indicator, and all disks are divided into a plurality of disk groups such as a hot disk group, a cold disk group, a hot standby disk group, a cold standby disk group, and a sleep disk group.

In some embodiments, the disks are grouped by using a maximum benefit algorithm. The following uses an example in S211 to S213 to describe how to group the disks by using the maximum benefit algorithm.

S211: The controller determines a plurality of candidate grouping manners and a benefit parameter of each candidate grouping manner based on the IO load.

The benefit parameter is also called an energy-saving benefit. The benefit parameter is used to indicate energy consumption that can be reduced in the candidate grouping manner. In some embodiments, when the controller groups the disks in the candidate grouping manner and performs a corresponding energy-saving measure on each disk group, the storage system reduces energy consumption, and a benefit parameter is, for example, costs of reduced energy consumption.

Specifically, the benefit parameter is calculated in a plurality of manners. In some embodiments, the benefit parameter is determined based on historical data and predicted IO load in a future time period. In some embodiments, the controller invokes an energy-saving benefit algorithm to calculate the benefit parameter. An input parameter of the energy-saving benefit algorithm includes at least one of collected sensor data, IO read/write data, CPU usage, memory usage, disk group data, power consumption corresponding to different groups, a service level agreement (SLA) indicator, a performance indicator, and a reliability indicator. Output parameters of the energy-saving benefit algorithm include the disk grouping manner and the benefit parameter. The energy-saving benefit algorithm includes but is not limited to a binary-tree decision-making method, a greedy algorithm, and the like. For example, the energy-saving benefit algorithm is selected based on a prediction error and a benefit error, and a specific algorithm type of the energy-saving benefit algorithm is not limited in this embodiment.

S212: The controller determines a target grouping manner from the plurality of candidate grouping manners based on the benefit parameter of each candidate grouping manner.

The target grouping manner is also called a best benefit scheme. The target grouping manner is a grouping manner having a largest benefit parameter in the plurality of candidate grouping manners. For example, benefit parameters of the plurality of candidate grouping manners are compared, and a grouping manner having a largest benefit parameter is selected as the target grouping manner.

S213: The controller groups, in the target grouping manner, the plurality of disks included in the storage system.

In the foregoing manner, the disks are grouped using the maximum benefit algorithm when the SLA and the reliability indicator are met. This effectively solves a problem that a low energy-saving benefit is caused by disk sleep triggered by a fixed threshold or a scheduled task, and maximizes an energy-saving benefit.

In some embodiments, a disk group to which a disk belongs can be dynamically switched. A unit of disk grouping level switching is not limited in this embodiment. Optionally, the disk grouping level switching is performed in a unit of a single disk. To be specific, a disk group to which a disk belongs is adjusted each time, so that a status of the disk changes. Optionally, the disk grouping level switching is performed in a unit of a RAID group. That is, a disk group to which each disk in a RAID group belongs is adjusted each time, so that a status of the RAID group changes collectively.

A direction of the disk grouping level switching is not limited in this embodiment. Optionally, at least one disk is switched from a next disk group to a previous disk group, to supplement the previous disk group with the disk in the next disk group. Optionally, at least one disk is switched from a previous disk group to a next disk group, to supplement the next disk group with the disk in the previous disk group. A manner of disk switching between different disk groups includes but is not limited to a partial switching manner or an overall switching manner. For example, when disks are switched from a disk group A to a disk group B, partial switching is to switch some disks in the disk group A to the disk group B, and the disk group A still has a disk after the switching, in other words, a quantity of disks in the disk group A is not 0 after the switching; and overall switching is to switch all disks in the disk group A to the disk group B, and a quantity of disks in the disk group A is 0 after the switching. Whether the partial switching manner or the overall switching manner is used is not limited in this embodiment.

In some embodiments, a disk group to which a disk belongs is dynamically switched, and a quantity of disks in each disk group is dynamically variable. In some cases, a quantity of disks in one or more disk groups in the storage system changes to 0 after switching. For example, the controller switches all disks in the second disk group and all disks in the third disk group to the first disk group. After the switching, a quantity of disks in the second disk group changes to 0, a quantity of disks in the third disk group also changes to 0, and all disks in the storage system belong to the first disk group. For another example, the controller switches all disks in the first disk group and all disks in the second disk group to the third disk group. After the switching, a quantity of disks in the first disk group changes to 0, a quantity of disks in the second disk group also changes to 0, and all disks in the storage system belong to the third disk group.

A disk group to which a disk belongs is switched in a plurality of manners. The following uses a switching policy 1 to a switching policy 3 as examples to describe manners of switching the disk group to which the disk belongs. That the following switching policy 1 to switching policy 3 use, for example, a partial switching manner or an overall switching manner is not limited in this embodiment.

Switching Policy 1: Switching Based on a Change of IO Load

Specifically, the controller detects IO load, and if the IO load of the storage system changes, the controller adjusts a disk group to which a disk in the storage system belongs. The IO load changes in two cases: The IO load increases and the IO load decreases. The following separately describes the two cases by using a case A and a case B as examples.

Case A: The IO Load Increases.

If the IO load increases, the controller switches at least one disk in a next disk group to a previous disk group. For example, if IO load of the first disk group increases, the controller switches at least one disk in the second disk group to the first disk group; and if IO load of the second disk group increases, the controller switches at least one disk in the third disk group to the second disk group.

When partial switching is used, if IO load of the first disk group increases, the controller switches some disks in the second disk group to the first disk group; and if IO load of the second disk group increases, the controller switches some disks in the third disk group to the second disk group.

When overall switching is used, if IO load of the first disk group increases, the controller switches all disks in the second disk group to the first disk group; and if IO load of the second disk group increases, the controller switches all disks in the third disk group to the second disk group.

For example, the storage system includes a disk A and a disk B. The disk A is originally divided into the second disk group, and the disk A is in an energy-saving state. The disk B is originally divided into the third disk group, and the disk B is in a sleep state. When the IO load increases, the storage system switches the disk A to the first disk group, so that the disk A is switched from the energy-saving state to a normal state; and the storage system switches the disk B to the second disk group, so that the disk B is switched from the sleep state to an energy-saving state.

In this manner, when it is predicted that a service increases greatly in the future and each disk group in the current grouping manner cannot meet a requirement, a disk in a next disk group is switched to a previous disk group for a supplement, to expand a capacity of the previous disk group. In this way, the disk grouping manner is adaptively adjusted based on the change of the IO load, and a disk is precisely woken up as the service increases.

Case B: The IO Load Decreases.

If the IO load decreases, the controller switches at least one disk in a previous disk group to a next disk group. For example, if IO load of the first disk group decreases, the controller switches at least one disk in the first disk group to the second disk group; and if IO load of the second disk group decreases, the controller switches at least one disk in the second disk group to the third disk group.

When partial switching is used, if IO load of the first disk group decreases, the controller switches some disks in the first disk group to the second disk group; and if IO load of the second disk group decreases, the controller switches some disks in the second disk group to the third disk group.

When overall switching is used, if IO load of the first disk group decreases, the controller switches all disks in the first disk group to the second disk group; and if IO load of the second disk group decreases, the controller switches all disks in the second disk group to the third disk group.

For example, the storage system includes a disk C and a disk D. The disk C is originally divided into the first disk group, and the disk C is in a normal state. The disk D is originally divided into the second disk group, and the disk D is in an energy-saving state. When the IO load decreases, the storage system switches the disk C to the second disk group, so that the disk C is switched from the normal state to an energy-saving state; and the storage system switches the disk D to the third disk group, so that the disk D is switched from the energy-saving state to a sleep state.

In this manner, when it is predicted that the IO load decreases greatly in the future time period and that data stored on a disk is not read or written for a long time, a disk in each disk group is switched to a next disk group, group by group. In this way, the disk grouping manner is adaptively adjusted based on the change of the IO load, and a disk precisely sleep as the service decreases. This helps improve an energy-saving benefit and maximally reduce power consumption of a storage disk array.

Switching Policy 2: Switching Based on a Service Requirement

The service requirement refers to performance or a corresponding indicator of IO load expected to be processed by the storage system. For example, the storage system determines whether the indicator meets a condition; and if the indicator of the storage system does not meet the condition, the controller adjusts a disk group to which a disk in the storage system belongs. The indicator includes at least one of an SLA indicator, a performance indicator, or a reliability indicator. A dimension for an indicator includes a plurality of cases. For example, the indicator includes at least one of a CPU usage indicator, a CPU frequency indicator, a disk IO bandwidth indicator, an IO latency indicator, a memory usage indicator, a memory latency indicator, a data security indicator, or a storage capacity indicator.

In this manner, when the SLA indicator, performance indicator, or reliability indicator of the storage system does not meet a requirement, a status of a disk in a next disk group can be changed in a timely manner to supplement a previous disk group. In this way, a service performance indicator of each disk group maintains in a normal range. This helps ensure that the performance and service level indicators are achieved and ensure that SLA performance meets a user expectation.

In some embodiments, if the indicator of the storage system does not meet the condition, the controller switches at least one disk in the second disk group to the first disk group, and switches at least one disk in the third disk group to the second disk group. In this manner, if the service requirement exceeds a capability of the first disk group, a capacity of the first disk group is expanded in a timely manner, and a disk in the second disk group is supplemented.

When partial switching is used, if the indicator of the storage system does not meet the condition, the controller switches some disks in the second disk group to the first disk group, and switches some disks in the third disk group to the second disk group.

When overall switching is used, if the indicator of the storage system does not meet the condition, the controller switches all disks in the second disk group to the first disk group, and switches all disks in the third disk group to the second disk group.

Switching policy 3: Switching Based on a Quantity of Disks in a Disk Group

The controller determines whether a quantity of disks included in the first disk group, the second disk group, or the third disk group meets a condition. If the quantity of disks included in the first disk group, the second disk group, or the third disk group does not meet the condition, the controller adjusts a disk group to which at least one disk in the storage system belongs.

In some embodiments, when a quantity of disks in a previous disk group is less than a quantity threshold, at least one disk in a next disk group is switched to the previous disk group, to supplement a disk in the previous disk group, and relieve a case in which the disk in the previous disk group is in shortage. Specifically, if the quantity of disks included in the first disk group is less than a quantity threshold, the controller switches at least one disk in the second disk group to the first disk group; and if the quantity of disks included in the second disk group is less than a quantity threshold, the controller switches at least one disk in the third disk group to the second disk group.

When partial switching is used, if the quantity of disks included in the first disk group is less than a quantity threshold, the controller switches some disks in the second disk group to the first disk group; and if the quantity of disks included in the second disk group is less than a quantity threshold, the controller switches some disks in the third disk group to the second disk group.

When overall switching is used, if the quantity of disks included in the first disk group is less than a quantity threshold, the controller switches all disks in the second disk group to the first disk group; and if the quantity of disks included in the second disk group is less than a quantity threshold, the controller switches all disks in the third disk group to the second disk group.

In some embodiments, the storage system further includes a processor. For example, as shown in FIG. 1, a processor 127 in the storage node 120*a* is an example description for the processor. In some embodiments, after determining the IO load in the future time period, the controller further adjusts a frequency of the processor, a voltage of the processor, and a status of a processing core in the processor based on the IO load, to perform energy-saving control on the processor. For example, if it is predicted that the IO load is higher than the load threshold, the controller sends an enabling instruction to the processor, to instruct the processor to enable at least one processing core, so as to process more services by using the newly started processing core. For example, if the IO load is lower than the load threshold, the controller sends a disabling instruction to the processor, to instruct the processor to disable at least one processing core or enable the processor to enter a sleep state. In this way, more power consumption is reduced.

In some embodiments, the storage system further includes a fan. For example, as shown in FIG. 1, a fan 124 in the storage node 120*a* is an example description for the fan. In some embodiments, after determining the IO load in the future time period, the controller further adjusts a speed of the fan based on the IO load, to perform energy-saving control on the fan. For example, if the IO load is higher than the load threshold, the controller sends an acceleration instruction to the fan, to instruct the fan to increase a rotational speed. For example, if the IO load is lower than the load threshold, the controller sends a deceleration instruction to the fan, to instruct the fan to reduce a rotational speed.

In some embodiments, the storage system further includes a power supply. For example, as shown in FIG. 1, a power supply 126 in the storage node 120*a* is an example description for the power supply. In some embodiments, after determining the IO load in the future time period, the controller further adjusts a working status of the power supply based on the IO load, to perform energy-saving control on the power supply. For example, if the IO load is lower than the load threshold, the controller sends a sleep instruction to the power supply to instruct the power supply to enter a sleep state.

In some embodiments, the storage system further includes a memory. For example, as shown in FIG. 1, a memory 125 in the storage node 120*a* is an example description for the memory.

In some embodiments, the storage system further includes a network adapter. The network adapter is configured to provide a data communication function. For example, as shown in FIG. 1, a network adapter 123 in the storage node 120*a* is an example description for the network adapter.

The foregoing describes the system architecture from a perspective of hardware, and the following describes a logical function architecture in this embodiment from a perspective of software.

In some embodiments, a logical function architecture of the energy-saving control method includes function modules such as an SLA indicator module, a reliability indicator module, a disk grouping algorithm, a maximum benefit algorithm, and a risk processing unit. These function modules are implemented by software. These function modules run, for example, on a controller of a storage system. These function modules are generated after a processor of the controller reads program code stored in a memory. For a specific implementation process of these function modules, refer to the foregoing descriptions of the storage system.

The SLA indicator module is used to: monitor and ensure achievement of performance and service level indicators in real time, such as CPU usage, a CPU frequency, disk IO bandwidth, an IO latency, memory usage, a memory latency, and data security; and determine whether a current indicator exceeds a threshold, to ensure that SLA performance meets a user expectation.

The reliability indicator module is used to evaluate a reliability indicator of each component after an energy-saving measure is taken, to ensure that the energy-saving measure does not affect reliability of each component, for example, ensure that a disk failure rate does not increase due to frequent sleep and wakeup within a life cycle and ensure that each parameter setting does not exceed a threshold.

The disk grouping algorithm is used to divide all disks into a plurality of groups such as a hot disk group, a cold disk group, a hot standby disk group, a cold standby disk group, and a sleep disk group. A proper allocation quantity of disks in each group is calculated based on hardware configuration, a service load mode, an IO prediction trend, an SLA, and a reliability indicator.

The maximum benefit algorithm is used to, on a premise that the SLA and the reliability indicator are met, invoke a grouping algorithm to group disks and calculate an energy-saving benefit of a different grouping solution based on a service prediction model. The maximum benefit algorithm may cover different time dimensions such as a short period and a long period of the prediction model.

The risk processing unit is used to perform risk processing. Specifically, the risk processing unit is used to identify a risk of the disk energy-saving solution described above and provide an emergency solution based on the risk. For example, if an IO load jump causes an excessively large error between predicted IO load and actual IO load, a processing policy corresponding to the IO load jump is performed. For example, if service performance deteriorates due to an improper disk grouping manner, a processing policy corresponding to the service performance deterioration is performed.

The foregoing describes the system architecture. The following describes, by using a method 400 and a method 500 as examples, a method procedure for performing a task based on the system architecture provided above.

Figure 6:
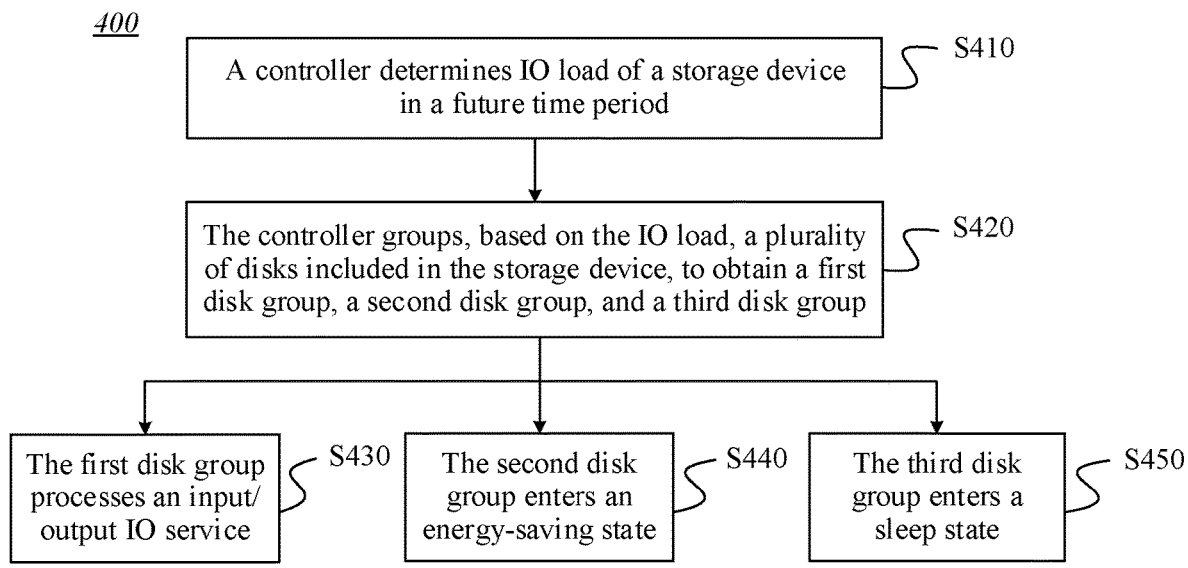
FIG. 6 is a flowchart of an energy-saving control method according to an embodiment of this application.

FIG. 6 is a flowchart of the energy-saving control method 400 according to an embodiment of this application.

The method 400 is performed by a storage system. Optionally, the method 400 is performed by a storage node in a distributed storage system. For example, the method 400 is performed by the storage node 120a, the storage node 120b, and the storage node 120c in the system architecture shown in FIG. 1. Optionally, the method 400 is performed by a centralized storage system.

For example, the method 400 includes S410 to S440.

S410: A controller determines IO load of a storage system in a future time period.

S420: The controller groups, based on the IO load, a plurality of disks included in the storage system, to obtain a first disk group, a second disk group, and a third disk group.

S430: The first disk group processes an IO service.

S440: The second disk group enters an energy-saving state.

S450: The third disk group enters a sleep state.

It should be understood that a time sequence of S430, S440, and S450 is not limited in this embodiment. In some embodiments, S430, S440, and S450 may be sequentially performed. For example, S430 may be performed before S440 and S450; or S440 and S450 may be performed before S430. In some other embodiments, S430, S440, and S450 may be performed concurrently, that is, S430, S440, and S450 may be performed at the same time.

The following uses the method 500 as an example to describe the method 400. The method 500 shows control logic of disk sleep. For specific implementation details, refer to the foregoing descriptions.

Figure 7:
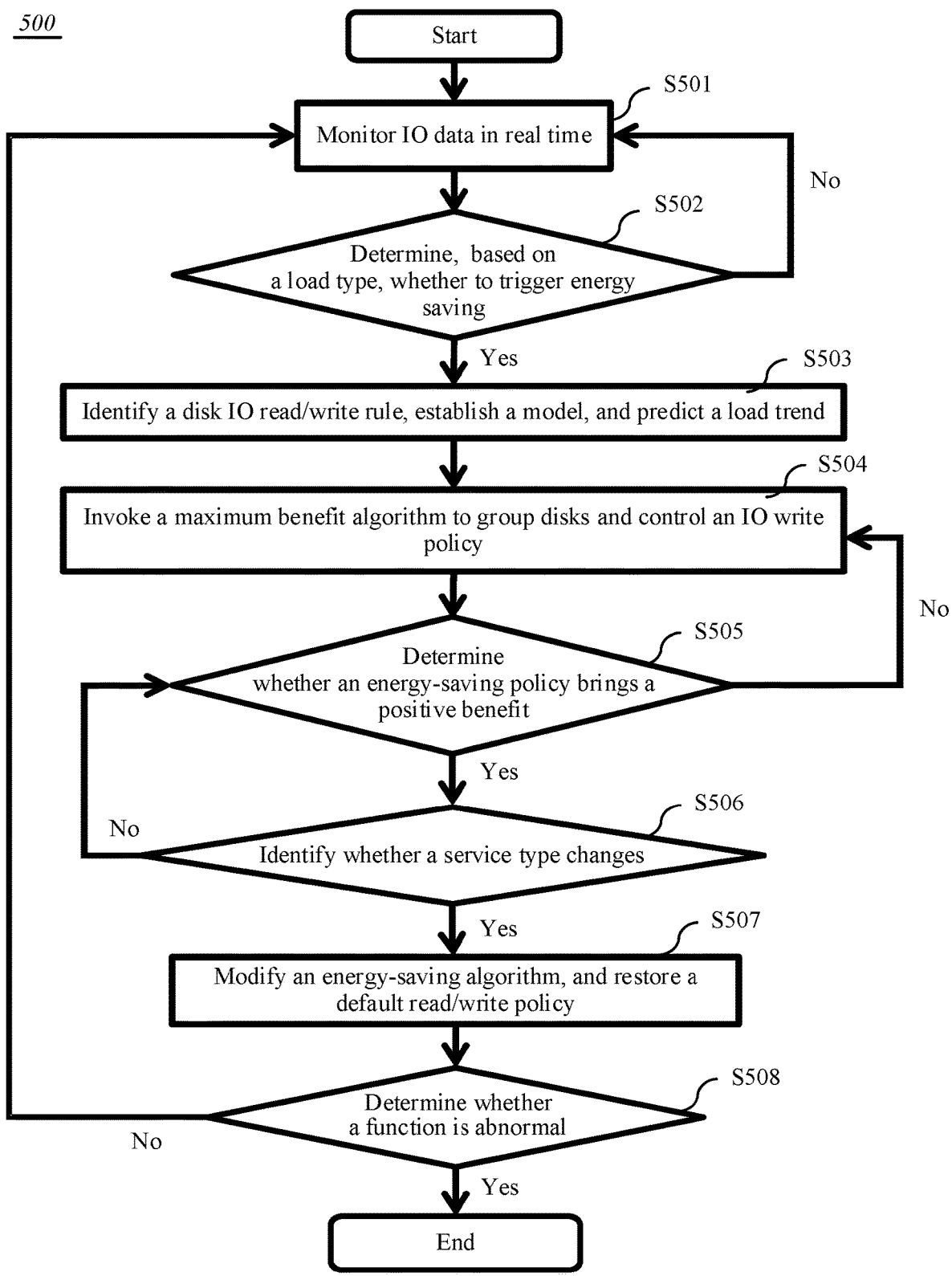
FIG. 7 is a flowchart of an energy-saving control method according to an embodiment of this application.

FIG. 7 is a flowchart of the energy-saving control method 500 according to an embodiment of this application. The method 500 includes S501 to S508.

S501: A controller monitors IO data in real time.

S502: The controller determines, based on a type of IO load corresponding to the IO data, whether to trigger energy saving. If it is determined, based on the type of IO load, to trigger energy saving, the following S503 is performed; or if it is determined, based on the type of IO load, not to trigger energy saving, S501 is performed.

S503: The controller identifies a disk IO read/write rule, establishes a model, and predicts a load trend.

S504: The controller invokes a maximum benefit algorithm to group disks and control an IO write policy.

S505: The controller determines whether an energy-saving policy brings a positive benefit. If the energy-saving policy brings the positive benefit, S506 is performed.

S506: The controller identifies whether a service type changes. If the service type changes, S507 is performed. If the service type does not change, S505 is performed.

S507: The controller modifies an energy-saving algorithm, and restores a default read/write policy.

S508: The controller determines whether a function is abnormal; and if the function is normal, ends the process; or if the function is abnormal, performs S501.

The foregoing describes the energy-saving control method in embodiments of this application. The following describes an energy-saving control apparatus in embodiments of this application. An energy-saving control apparatus 600 runs on a controller of a storage system, and the storage system includes at least one disk.

Figure 8:
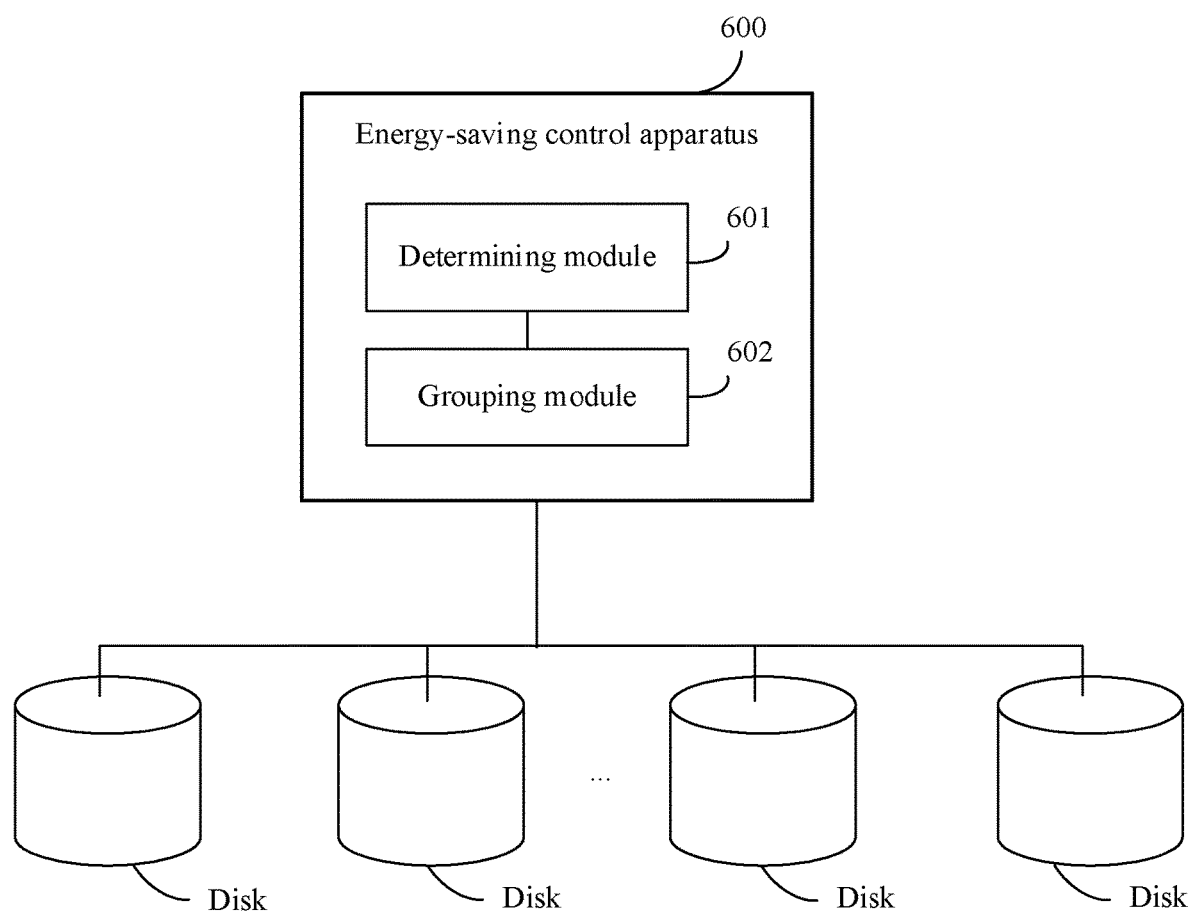
FIG. 8 is a schematic diagram of a structure of an energy-saving control apparatus according to an embodiment of this application.

FIG. 8 is a schematic diagram of a structure of an energy-saving control apparatus according to an embodiment of this application. As shown in FIG. 8, the energy-saving control apparatus 600 includes: a determining module 601, configured to perform at least one of the method 300, S410, S501, S502, or S503; and a grouping module 602, configured to perform S420 or S504.

In some embodiments, the energy-saving control apparatus 600 further includes an adjustment module, and the adjustment module is configured to adjust a disk group to which a disk belongs.

It should be understood that the energy-saving control apparatus 600 corresponds to the storage system in the foregoing method 300, method 400, or method 500, and the modules in the energy-saving control apparatus 600 and the foregoing other operations and/or functions are intended to implement various steps and methods implemented by the storage system in the foregoing method 300, method 400, or method 500. For specific details, refer to the foregoing method 300, method 400, or method 500. For brevity, details are not described herein again.

It should be understood that, when the energy-saving control apparatus 600 performs energy-saving control, division of the foregoing function modules is merely used as an example for description. In actual application, the foregoing functions may be allocated to different function modules for implementation based on a requirement. In other words, an internal structure of the energy-saving control apparatus is divided into different function modules, to implement all or some of the functions described above. In addition, the energy-saving control apparatus provided in the foregoing embodiment pertains to a same concept as the foregoing method 300, method 400, or method 500. For a specific implementation process of the energy-saving control apparatus, refer to the foregoing method 300, method 400, or method 500. Details are not described herein again.

Persons of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of this application.

It may be clearly understood by persons skilled in the art that, for convenient and brief description, for a detailed working process of the foregoing system, apparatus, and module, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, function modules in embodiments of this application may be integrated into one processing module, or each of the modules may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of the various examples, a first disk group may be referred to as a second disk group, and similarly, a second disk group may be referred to as a first disk group. Both the first disk group and the second disk group may be disk groups, and in some cases, may be separate and different disk groups.

The term "at least one" in this application means one or more, and the term "a plurality of" in this application means two or more than two. For example, "a plurality of disks" means two or more than two disks.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific implementations of this application, but are not intended to limit the protection scope of this application. Any modification or replacement readily figured out by persons skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement embodiments, all or a part of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by the computer, or a data storage system, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive), or the like.

Persons of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A storage system, comprising:
a first disk group;
a second disk group; and
a third disk group,
wherein the first disk group is configured to process an input/output (IO) service,
wherein the second disk group is configured to provide a first standby disk for the first disk group, and wherein the second disk group is in an energy-saving state, and
wherein the third disk group is configured to provide a second standby disk for the second disk group, wherein the third disk group is in a sleep state, and wherein power consumption corresponding to the third disk group in the sleep state is greater than o.

2. The storage system according to claim 1,
wherein the second disk group comprises a hot standby disk group and a cold standby disk group,
wherein the hot standby disk group is in a hot standby state, and a wakeup latency corresponding to the hot standby state is lower than a latency threshold, and
wherein the cold standby disk group is in a cold standby state, power consumption corresponding to the cold standby state is less than a power consumption threshold, and at least one disk in the cold standby disk group is switched to the hot standby disk group in response to disk shortage in the hot standby disk group.

3. The storage system according to claim 1,
wherein the first disk group comprises a hot disk group and a cold disk group,
wherein a first access frequency of first data stored in the hot disk group is greater than a frequency threshold, and
wherein a second access frequency of second data stored in the cold disk group is less than the frequency threshold.

4. The storage system according to claim 1,
wherein the storage system further comprises a controller,
wherein the controller is configured to perform:
determining an IO load of the storage system in a future time period, wherein the IO load indicates processing pressure of performing a read operation or a write operation by the storage system, and
grouping, based on the IO load, a plurality of disks in the storage system to obtain the first disk group, the second disk group, and the third disk group.

5. The storage system according to claim 4, wherein the grouping, based on the IO load, the plurality of disks comprises:
determining a plurality of candidate grouping manners and a corresponding benefit parameter of each candidate grouping manner of the plurality of candidate grouping manners based on the IO load, wherein the corresponding benefit parameter indicates corresponding energy consumption that can be reduced in the each candidate grouping manner, and wherein the each candidate grouping manner of the plurality of candidate grouping manners corresponds to different grouping of the plurality of disks into the first disk group, the second disk group, and the third disk group;
determining a target grouping manner from the plurality of candidate grouping manners based on the corresponding benefit parameter of the each candidate grouping manner, wherein the target grouping manner has a largest benefit parameter; and
grouping, in the target grouping manner, the plurality of disks in the storage system.

6. The storage system according to claim 4, wherein the grouping, based on the IO load, the plurality of disks comprising:
based on the IO load being higher than a load threshold, grouping, in a first grouping manner of grouping of the plurality of disks into the first disk group, the second disk group, and the third disk group, the plurality of disks in the storage system; or
based on the IO load being lower than the load threshold, grouping, in a second grouping manner of grouping of the plurality of disks into the first disk group, the second disk group, and the third disk group, the plurality of disks in the storage system, wherein a second quantity of disks in the first disk group in the second grouping manner is less than a first quantity of disks in the first disk group in the first grouping manner, and wherein a fourth quantity of disks in the third disk group in the second grouping manner is greater than a third quantity of disks in the third disk group in the first grouping manner.

7. The storage system according to claim 1, wherein access frequency of each disk in the first disk group is greater than access frequency of any disk in the second disk group.

8. The storage system according to claim 4, wherein the controller is further configured to perform at least one of:
adjusting, based on the IO load of the storage system changing, a disk group to which a first disk in the storage system belongs;
adjusting, based on an indicator of the storage system not meeting a first condition, a disk group to which a second disk in the storage system belongs, wherein the indicator comprises at least one of a service level agreement (SLA) indicator, a performance indicator, or a reliability indicator; or
adjusting, based on a quantity of disks in the first disk group, the second disk group, or the third disk group not meeting a second condition, a disk group to which a third disk in the storage system belongs.

9. The storage system according to claim 8, wherein the adjusting the disk group to which the first disk in the storage system belongs comprises:
- switching second at least one disk in the second disk group to the first disk group based on the IO load of the first disk group increasing; or switching first at least one disk in the first disk group to the second disk group based on the IO load of the first disk group decreasing; and
- switching third at least one disk in the third disk group to the second disk group based on the IO load of the second disk group increasing; or switching fourth at least one disk in the second disk group to the third disk group if the IO load of the second disk group decreasing.

10. The storage system according to claim 8, wherein the adjusting the disk group to which the second disk in the storage system belongs based on the indicator of the storage system not meeting the first condition comprises:
- switching first at least one disk in the second disk group to the first disk group; and
- switching second at least one disk in the third disk group to the second disk group.

11. The storage system according to claim 8, wherein the adjusting the disk group to which the third disk in the storage system belongs based on the quantity of disks in the first disk group, the second disk group, or the third disk group not meeting the second condition comprises:
- switching first at least one disk in the second disk group to the first disk group based on the quantity of disks in the first disk group being less than a quantity threshold; and
- switching second at least one disk in the third disk group to the second disk group based on the quantity of disks in the second disk group being less than the quantity threshold.

12. A method, comprising:
- processing, by a first disk group of a storage system, an input/output (IO) service, wherein the storage system further comprises a second disk group and a third disk group;
- providing, by the second disk group, a first standby disk for the first disk group, wherein the second disk group is in an energy-saving state; and
- providing, by the third disk group, a second standby disk for the second disk group, wherein the third disk group is in a sleep state, and wherein power consumption corresponding to the third disk group in the sleep state is greater than 0.

13. The method according to claim 12,
wherein the second disk group comprises a hot standby disk group and a cold standby disk group,
wherein the hot standby disk group is in a hot standby state, and a wakeup latency corresponding to the hot standby state is lower than a latency threshold, and
wherein the cold standby disk group is in a cold standby state, power consumption corresponding to the cold standby state is less than a power consumption threshold, and at least one disk in the cold standby disk group is switched to the hot standby disk group in response to disk shortage in the hot standby disk group.

14. The method according to claim 12,
wherein the first disk group comprises a hot disk group and a cold disk group,
wherein a first access frequency of first data stored in the hot disk group is greater than a frequency threshold, and
wherein a second access frequency of second data stored in the cold disk group is less than the frequency threshold.

15. The method according to claim 12, wherein the storage system further comprises a controller, and the method comprises:
- determining, by the controller, an IO load of the storage system in a future time period, wherein the IO load indicates processing pressure of performing a read operation or a write operation by the storage system; and
- grouping, by the controller based on the IO load, a plurality of disks in the storage system to obtain the first disk group, the second disk group, and the third disk group.

16. The method according to claim 15, wherein the grouping, based on the IO load, the plurality of disks in the storage system specifically comprises:
- determining, by the controller, a plurality of candidate grouping manners and a corresponding benefit parameter of each candidate grouping manner of the plurality of candidate grouping manners based on the IO load, wherein the corresponding benefit parameter indicates corresponding energy consumption that can be reduced in the each candidate grouping manner, and wherein the each candidate grouping manner of the plurality of candidate grouping manners corresponds to different grouping of the plurality of disks into the first disk group, the second disk group, and the third disk group;
- determining, by the controller, a target grouping manner from the plurality of candidate grouping manners based on the corresponding benefit parameter of the each candidate grouping manner, wherein the target grouping manner has a largest benefit parameter; and
- grouping, by the controller in the target grouping manner, the plurality of disks in the storage system.

17. The method according to claim 15, wherein the grouping, based on the IO load, the plurality of disks in the storage system specifically comprises:
- based on the IO load being higher than a load threshold, grouping, by the controller in a first grouping manner of grouping of the plurality of disks into the first disk group, the second disk group, and the third disk group, the plurality of disks in the storage system; or
- based on the IO load being lower than the load threshold, grouping, by the controller in a second grouping manner of grouping of the plurality of disks into the first disk group, the second disk group, and the third disk group, the plurality of disks in the storage system, wherein a second quantity of disks in the first disk group in the second grouping manner is less than a first quantity of disks in the first disk group in the first grouping manner, and wherein a fourth quantity of disks in the third disk group in the second grouping manner is greater than a third quantity of disks in the third disk group in the first grouping manner.

18. The method according to claim 15, wherein the method further comprises at least one of:
- adjusting, by the controller based on the IO load of the storage system changing, a disk group to which a first disk in the storage system belongs;
- adjusting, by the controller based on an indicator of the storage system not meeting a first condition, a disk group to which a second disk in the storage system belongs, wherein the indicator comprises at least one of a service level agreement (SLA) indicator, a performance indicator, or a reliability indicator; or adjusting, by the controller based on a quantity of disks in the first disk group, the second disk group, or the third disk group not meeting a second condition, a disk group to which a third disk in the storage system belongs.

19. The method according to claim 18, wherein the adjusting, by the controller based on the IO load of the storage system changing, the disk group to which the first disk in the storage system belongs comprises:
- based on the IO load of the first disk group increasing, switching, by the controller, second at least one disk in the second disk group to the first disk group; or based on the IO load of the first disk group decreasing, switching, by the controller, first at least one disk in the first disk group to the second disk group; and
- based on the IO load of the second disk group increasing, switching, by the controller, third at least one disk in the third disk group to the second disk group; or based on the IO load of the second disk group decreasing, switching, by the controller, fourth at least one disk in the second disk group to the third disk group.

20. The method according to claim 18, wherein the adjusting, by the controller based on the indicator of the storage system not meeting the first condition, the disk group to which the second disk in the storage system belongs comprises:
- switching, by the controller, first at least one disk in the second disk group to the first disk group; and
- switching second at least one disk in the third disk group to the second disk group.

21. The method according to claim 18, wherein the adjusting, by the controller based on the quantity of disks in the first disk group, the second disk group, or the third disk group not meeting the second condition, the disk group to which the third disk in the storage system belongs comprises:
- based on the quantity of disks in the first disk group being less than a quantity threshold, switching, by the controller, first at least one disk in the second disk group to the first disk group; and
- based on the quantity of disks in the second disk group being less than the quantity threshold, switching, by the controller, second at least one disk in the third disk group to the second disk group.

\* \* \* \* \*

UNITED STATES PATENT AND TRADEMARK OFFICE
CERTIFICATE OF CORRECTION

PATENT NO. : 12,164,789 B2
APPLICATION NO. : 18/145303
DATED : December 10, 2024
INVENTOR(S) : Wang et al.

Page 1 of 1

It is certified that error appears in the above-identified patent and that said Letters Patent is hereby corrected as shown below:

In the Claims

In Column 25, in Claim 1, Line 41, delete "than o." and insert -- than 0. --.

Signed and Sealed this
Fourth Day of February, 2025

Coke Morgan Stewart
*Acting Director of the United States Patent and Trademark Office*